Feb. 11, 1969     F. S. RUDOLPH     3,426,470
ANIMAL TRAP
Filed July 21, 1966
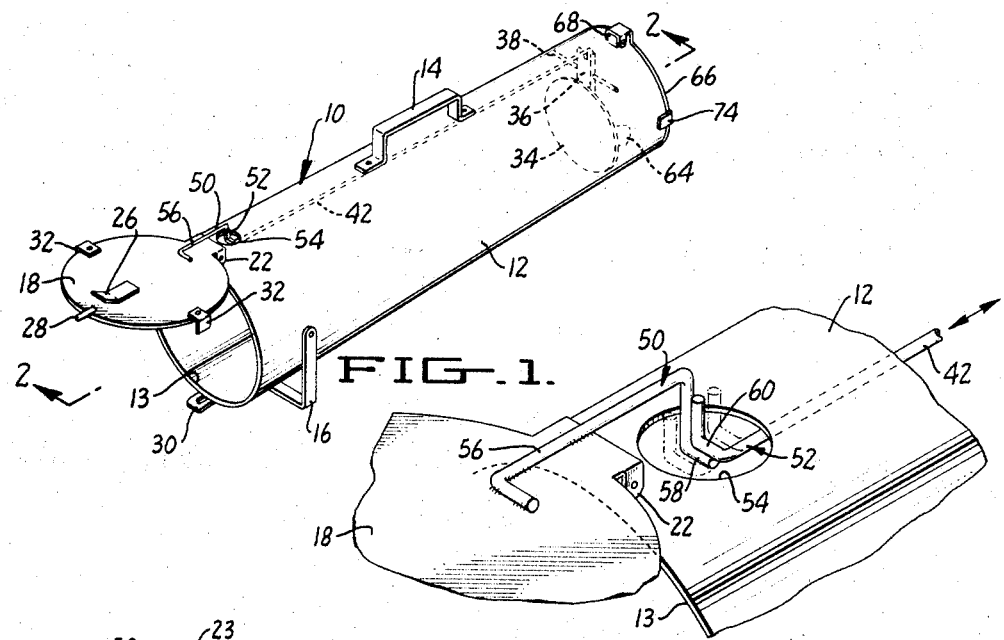
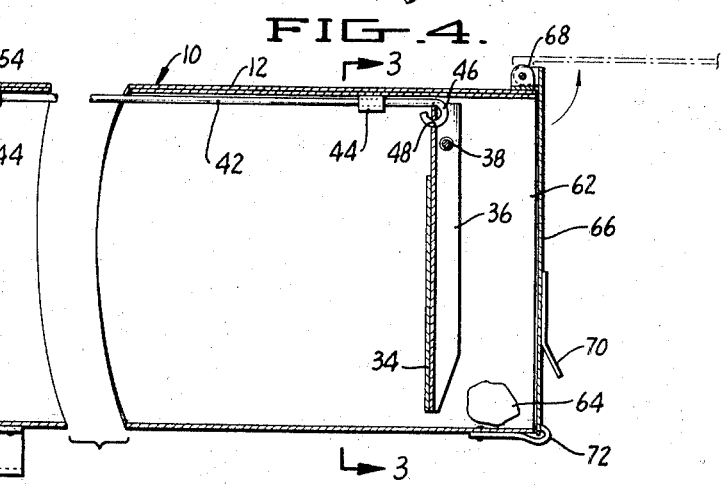
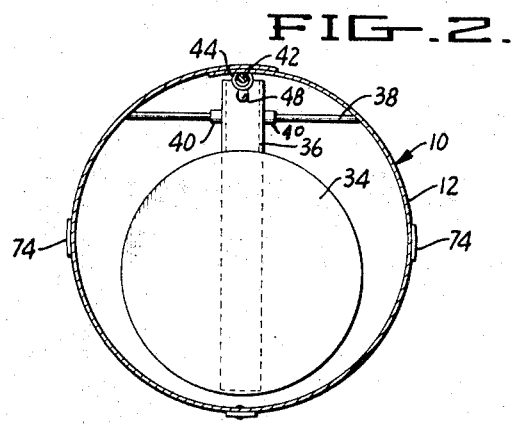
INVENTOR.
FAUCETTE S. RUDOLPH
BY
*Naylor + Neal*
ATTORNEYS United States Patent Office 3,426,470
Patented Feb. 11, 1969

3,426,470
ANIMAL TRAP
Faucette S. Rudolph, 6122 Sonoma Highway,
Santa Rosa, Calif. 95405
Filed July 21, 1966, Ser. No. 566,994
U.S. Cl. 43—61                                           1 Claim
Int. Cl. A01m 23/18

ABSTRACT OF THE DISCLOSURE

A trap for the capture of animals comprising, a tubular enclosure having a gate at one end thereof spring biased towards a closed position and a trigger mechanism disposed within the enclosure to selectively maintain the gate in an open position and automatically effect its release responsive to the entry of an animal into the enclosure. The mechanism is made up of a baffle pivotally mounted within the enclosure and having a lever portion extending therefrom, a rod slidably received in the housing and connected to the lever portion of the baffle, and a pair of mutually engageable detents on the rod and gate to selectively maintain the gate in an open position. The detents are disposed so as to be confined within the enclosure upon their mutual engagement and an alignment aperture in the enclosure provides for manual manipulation of the detents to facilitate the engagement.

---

The present invention relates to an improved animal trap and, more particularly, to a portable trap for the live capture of animals.

Basically, the inventive trap comprises an enclosure of tubular form having an opening at one end thereof defining an entrance through which an animal may pass; a gate pivotally mounted on the housing for movement between positions, respectively, opening and closing the entrance; and, a trigger mechanism adapted to effect closing of the gate upon the entrance of an animal into the enclosure. The invention is particularly characterized in that the trigger mechanism is both highly sensitive and resistant to fouling. These characteristics result from the disposition of the mechanism within the enclosure in such a manner as to be responsive to both pushing and pulling forces imparted by animal contact.

Prior art traps for the live capture of animals typically employ the basic elements of the present invention broadly defined above. These traps have been characterized, however, in that the triggering mechanisms thereof include components disposed externally of their enclosures so as to be subject to fouling by foreign materials, such as camouflaging. Certain of these traps have also been characterized in that they include as part of their triggering mechanism mutually engageable detent elements which are not readily accessible. The latter characteristic is especially undesirable because it renders setting of the traps difficult.

Prior art traps for the live capture of animals have also been typically characterized in that the latching mechanisms thereof are only sensitive to force imparted thereto in one direction. As a result of this characteristic, it is possible for an animal to engage the triggering mechanism without effecting its activation.

It is, accordingly, a principal object of the present invention to provide a trap for the live capture of animals which avoids the aforementioned shortcomings of the prior art.

Another and more specific object of the invention is to provide an animal trap of the type described wherein the latching mechanism is not subject to ready fouling by foreign material disposed externally of the trap enclosure.

Still a further object of the invention is to provide an animal trap of the type described wherein the latching mechanism may be set with a minimum of difficulty.

Yet another specific object of the invention is to provide an animal trap of the type described wherein the triggering mechanism is sensitive to both pushing and pulling forces imparted thereto.

The details of the present invention and the foregoing and other objects will become more readily apparent from the following detailed description and accompanying drawing, wherein:

FIG. 1 is a perspective view of a preferred embodiment of the inventive animal trap;

FIG. 2 is a foreshortened cross-sectional view taken on the plane designated by line 2—2 in FIG. 1;

FIG. 3 is a cross-sectional view taken along the plane designated by line 3—3 in FIG. 2; and FIG. 4 is an enlarged partial perspective view, similar to FIG. 1, illustrating the mutually engageable detent elements employed in the trigger mechanism of the inventive trap.

Referring now in more detail to the drawings, and particularly to FIG. 1, the inventive animal trap is designated therein in its entirety by the numeral 10. The trap 10 includes as a basic component thereof a tubular enclosure 12 having an opening 13 at one end thereof defining an entrance through which animals may pass. A handle 14 is secured to the top of the enclosure 12 to facilitate its carrying. A foot 16 is mounted on the lower side of the enclosure to effect its support in an orientation sloping gently to the rear (i.e. to the right as viewed in FIG. 1). The foot 16 also functions to maintain the entrance gate latch structure of the trap clear of the ground for proper functioning.

An entrance gate 18 is mounted on the enclosure 12 for swinging movement between closed and open positions relative to the opening 13. These positions are illustrated, respectively, by the solid and phantom line representations of the gate illustrated in FIG. 2. Mounting of the entrance gate 18 is provided by a pin 20 supported on and extending transversely of the enclosure 12 and a pair of pin engaging ears 22 fixed to the gate 18 and pivotally received on the pin. The hinge mounting thus provided is resiliently biased to urge the gate to the closed condition by a coil biasing spring 23 of conventional nature received around the pin 20. Although not illustrated, it is to be understood that this spring would include free end or leg portions engaging, respectively, the enclosure 12 and gate 18.

Manual movement of the gate 18 is provided by a finger tab 26 secured to the external surface thereof. The gate also includes a holding pin 28 mounted on the lower extremity thereof for locking engagement with a leaf spring detent 30 secured to the enclosure 12. In operation, the detent 30 is adapted to deflect to permit engagement of the pin 28 therewith upon swinging of the gate to the closed position illustrated in FIG. 2. Release of the pin 28 may be effected simply by depressing the detent 30 manually.

Upon movement of the gate to the closed position illustrated in FIG. 2, alignment with the opening 13 is provided by guide tabs 32 mounted on either side of the gate for sliding engagement with the enclosure 12.

The trigger mechanism of the trap 10 is designed to, selectively, effect retention of the gate 18 in the open position and, upon entrance of an animal into the enclosure 12, release the gate for movement to the closed position. The mechanism comprises: a baffle 34 supported within the enclosure on a vertical strut 36 fixed thereto; a bearing shaft 38 fixed to and extending transversely of the enclosure through journal openings therefor (not illustrated) in the strut; a pair of collars 40 fixed to the shaft 38 to either side of the strut to maintain the strut centered on the shaft for rotation relative thereto; a latching rod 42 slidably mounted within the enclosure 12 by sleeve supports 44 depending from the interior surface thereof; a loop 46 formed on the rod 42 and pivotally received in an eye 48 extending through the strut 36 above the bearing shaft 38; a first detent 52 fixed to and extending laterally from the rod 42 has a portion extending through an opening 54 in the enclosure 12. Through this arrangement, the baffle 34 is mounted for back and forth movement within the enclosure 12 responsive, respectively, to pushing and pulling forces which may be imparted thereto by animal contact. During this movement, the strut 36 swings around the shaft 38 and, thus, movement is imparted to the rod 42 through the connection of the loop 46 with the strut.

Referring now specifically to FIG. 4, therein it can be seen that the detent 50 is comprised of a rectilinear arm 56 fixed to and extending laterally from the gate 18 and an L-shaped portion 58 formed on the end of the rod and disposed at an angle with respect to the longitudinal axis thereof. The detent 52 is similarly comprised of an L-shaped portion 60 formed on the rod 42 at an angle with respect to the longitudinal axis thereof. The portions 58 and 60 are so orientated relative to each other as to be adapted to assume a mutually engaged condition as illustrated in FIG. 4. In this condition, the detents function to hold the gate 18 in the open position. Positioning of the portions 58 and 60 in mutually engaged condition is facilitated by the orientation of the portions 58 and 60 which renders them readily accessible from the exterior of the enclosure 12. When the portions 58 and 60 are in the mutually engaged condition, their mutual disengagement is effected by movement of the rod 42 responsive to swinging movement of the baffle 34. This mutual disengagement is effected responsive to swinging of the baffle in either direction, since the portion 60 moves out of alignment with the portion 58 upon movement of the rod 42 responsive, respectively, to back and forth movement of the baffle. The manner in which the portion 60 may be disengaged from the portion 58 by movement to either side thereof is illustrated by the phantom line representations in FIG. 4.

The rear end of the enclosure 12 defines an opening 62 through which bait may be inserted into the enclosure to the rear of the baffle 34. For the sake of illustration, a particle of bait is represented by the numeral 64 in FIG. 2. The opening 62 is provided with a closure gate 66 similar to the gate 18, with the exception that it is adapted only for manual operation. The gate 66 is pivotally mounted on the enclosure 12 by a hinge 68 for movement between closed and open positions relative to the opening 62. These positions are illustrated, respectively, by the solid and phantom line representations of the gate in FIG. 2. A finger tab 70 is provided on the exterior of the gate 66 to facilitate manual movement thereof between the closed and open positions. A spring detent 72 is secured to the lower surface of the enclosure 12 for locking engagement with the lower edge of the gate 66 when it is in the closed position. To facilitate alignment of the gate 66 with the opening 62, guide tabs 74 are fixed to the gate for slidable engagement with the enclosure 12 upon closure of the gate.

Operation

In order to condition the trap for operation, the gate 66 is first swung to its open position and bait is located behind the baffle 34 in the manner represented at 64. After so locating the bait, the gate 66 is moved to the closed position illustrated in FIG. 2 and secured in place by the detent spring 72. At this point, the trap is positioned at the desired location and the entrance gate 18 is swung to the open position and retained in place by moving the detents 50 and 52 so that the portions 58 and 60 are in mutually engaged condition as illustrated in FIG. 2. The latter condition may be readily effected simply by gripping the portions 58 and 60 between the thumb and forefinger of one hand to move the portion 60 to a position directly above the portion 58. After thus preparing the trap, it is in condition for use in the capture of animals. If desired, the trap may be additionally prepared by applying suitable camouflage, such as branches and leaves, over its exterior surface.

In the prepared condition, when an animal enters the enclosure 12 in search of the bait disposed therein, he inevitably contacts the baffle 34 and effects its movement. This movement, in turn, effects movement of the latching rod 42 and mtually disengagement of the detents 50 and 52. Upon the latter occurrence, the entrance gate 18 is released and snaps to the closed position under the influence of the spring 23. In the latter position, the holding pin 28 is lockingly engaged in the detent 30 and, thus, animal escape from the enclosure is prevented.

Once an animal is captured in the trap 10, the trap, with the animal therein, may be transported to any desired location without danger that the animal may escape or impart injury to the user of the trap. Upon being transported to the desired location, the animal may be readily released simply by depressing the spring detent 30 and lifting the gate 18. After release of an animal from the trap, the trap may be re-used simpy by conditioning it in the manner described above.

From the foregoing description, it is believed apparent that the present invention enables the attainment of the objects initially set forth herein. It should especially be appreciated that an animal trap is provided wherein sensitive activation of the trigger mechanism is effected responsive to either pushing or pulling contact by an animal in search of bait contained in the trap.

What is claimed is:
1. An animal trap, comprising:
   (a) an enclosure of tubular form having an opening at one end thereof defining an entrance through which an animal may pass and a detent aligning aperture extending laterally therethrough;
   (b) a gate pivotally secured to said enclosure for movement relative thereto between positions, respectively, opening and closing said entrance;
   (c) biasing means operatively associated with said gate to effect the urging thereof to the position closing said entrance;
   (d) a trigger baffle pivotally mounted within said enclosure about an axis spaced from the upper inner surface thereof for substantially unrestricted back and forth swinging movement responsive to forces imparted thereto by animal contact, said baffle having a portion disposed beneath said axis for animal contact and an extension extending above said axis to define a lever;
   (e) an elongated latching rod confined over the length thereof within said housing and mounted thereon for longitudinal movement relative thereto, said rod being pivotally secured to said extension above said axis whereby swinging movement of said baffle in either direction imparts longitudinal movement to said rod through the lever defined by said extension; and,

(f) first and second detent extensions of generally rod-like configuration fixed to and extending laterally from, respectively, said rod and gate, said extension being:
  (1) adapted to assume mutually engaged overlapping relationship to hold said gate in open position and, upon movement of said rod in either direction responsive to swinging movement of said baffle, to assume a mutually disengaged relationship releasing said gate for movement to the closed position; and,
  (2) upon mutual engagement, disposed within said enclosure for access through said alignment opening to facilitate the manual manipulation thereof.

References Cited

UNITED STATES PATENTS

| | | | |
|---|---|---|---|
| 1,261,189 | 4/1918 | Tremble | 43—61 |
| 1,866,776 | 7/1932 | Sloulin | 43—61 |
| 2,573,228 | 10/1951 | Slauth | 43—61 |

FOREIGN PATENTS 593,241  10/1947  Great Britain.

WARNER H. CAMP, *Primary Examiner.*